United States Patent
Blake et al.

(10) Patent No.: US 7,745,064 B2
(45) Date of Patent: Jun. 29, 2010

(54) OXIDATION FACILITATOR

(75) Inventors: Adam P. Blake, Watertown, MA (US);
Scott C. Rackey, Bedford, MA (US);
Wei Bai, Westborough, MA (US)

(73) Assignee: CellTech Power LLC, Westborough, MA (US)

(*) Notice: Subject to any disclaimer, the term of this patent is extended or adjusted under 35 U.S.C. 154(b) by 1002 days.

(21) Appl. No.: 11/294,676

(22) Filed: Dec. 5, 2005

(65) Prior Publication Data
US 2007/0048555 A1    Mar. 1, 2007

Related U.S. Application Data (63) Continuation of application No. PCT/US2004/018733, filed on Jun. 10, 2004.

(60) Provisional application No. 60/477,281, filed on Jun. 10, 2003.

(51) Int. Cl.
H01M 2/00 (2006.01)
H01M 4/00 (2006.01)

(52) U.S. Cl. ............... 429/515; 429/523; 429/529; 429/443

(58) Field of Classification Search ......... 429/31–33, 429/40–41, 46, 102–104; 204/413, 196.38, 204/219, 250
See application file for complete search history.

(56) References Cited

U.S. PATENT DOCUMENTS

| | | | |
|---|---|---|---|
| 460,122 A | 9/1891 | Edison | |
| 3,138,490 A | 6/1964 | Tragert et al. | |
| 3,432,352 A | 3/1969 | White et al. | |
| 3,741,809 A | 6/1973 | Anbar | |
| 3,953,227 A | 4/1976 | Jones et al. | |
| 3,970,474 A | 7/1976 | Anbar et al. | |
| 3,982,957 A | 9/1976 | Jones et al. | |
| 4,042,755 A | 8/1977 | Anbar | |
| 4,170,534 A | 10/1979 | Fitterer | |
| 4,551,400 A | 11/1985 | Sapru et al. | |
| 4,670,702 A | 6/1987 | Yamada et al. | |
| 4,702,971 A * | 10/1987 | Isenberg | 429/31 |
| 4,824,739 A | 4/1989 | Breault et al. | |
| 4,826,740 A | 5/1989 | Costa | |

(Continued)

FOREIGN PATENT DOCUMENTS

DE    367151    1/1923

(Continued)

OTHER PUBLICATIONS

Alberty, R.A., "Electrochemical Cells Fuel Cells," *Physical Chemistry*(6th Ed.), pp. 228-229 (1983).

(Continued)

Primary Examiner—Dah-Wei D Yuan
Assistant Examiner—Claire L Rademaker
(74) Attorney, Agent, or Firm—Wolf, Greenfield & Sacks, P.C.

(57) ABSTRACT

Fuel oxidation facilitators for use in electrochemical devices are described, as well as devices incorporating facilitators and methods of their use. Exemplary facilitators separate a liquid anode of a fuel cell from fuel supplied to the fuel cell, and facilitate oxidation of the fuel.

29 Claims, 6 Drawing Sheets

U.S. PATENT DOCUMENTS

| | | | |
|---|---|---|---|
| 4,853,094 A | 8/1989 | Honders et al. |
| 4,883,724 A | 11/1989 | Yamamoto |
| 4,894,297 A | 1/1990 | Singh et al. |
| 4,973,531 A | 11/1990 | Zaima et al. |
| 5,035,962 A | 7/1991 | Jensen |
| 5,045,170 A | 9/1991 | Bullock et al. |
| 5,139,895 A | 8/1992 | Roy et al. |
| 5,290,323 A | 3/1994 | Okuyama |
| 5,298,340 A | 3/1994 | Cocks et al. |
| 5,312,699 A | 5/1994 | Yanagi et al. |
| 5,316,870 A | 5/1994 | Ohga |
| 5,348,812 A | 9/1994 | Cocks et al. |
| 5,350,641 A | 9/1994 | Mogensen et al. |
| 5,376,469 A | 12/1994 | Gur et al. |
| 5,455,127 A | 10/1995 | Olsen et al. |
| 5,523,177 A | 6/1996 | Kosek et al. |
| 5,532,078 A | 7/1996 | Redey et al. |
| 5,558,947 A | 9/1996 | Robison |
| 5,567,540 A | 10/1996 | Stone et al. |
| 5,589,287 A | 12/1996 | Hatoh et al. |
| 5,589,289 A | 12/1996 | Zhang et al. |
| 5,591,537 A | 1/1997 | Bagger et al. |
| 5,595,832 A | 1/1997 | Tomimatsu et al. |
| 5,595,833 A | 1/1997 | Gardner et al. |
| 5,601,945 A | 2/1997 | Clough |
| 5,604,048 A | 2/1997 | Nishihara et al. |
| 5,637,414 A | 6/1997 | Inoue et al. |
| 5,747,185 A | 5/1998 | Hsu |
| 5,750,278 A | 5/1998 | Gillett et al. |
| 5,766,786 A | 6/1998 | Fleck et al. |
| 5,866,090 A | 2/1999 | Nakagawa et al. |
| 5,942,349 A | 8/1999 | Badwal et al. |
| 5,985,474 A | 11/1999 | Chen et al. |
| 6,096,449 A | 8/2000 | Fuglevand et al. |
| 6,120,926 A | 9/2000 | Szydlowski et al. |
| 6,120,933 A | 9/2000 | Phelps |
| 6,127,057 A | 10/2000 | Gorman |
| 6,162,554 A | 12/2000 | Nolscher et al. |
| 6,200,697 B1 | 3/2001 | Pesavento |
| 6,242,120 B1 | 6/2001 | Herron |
| 6,265,093 B1 | 7/2001 | Surampudi et al. |
| 6,300,011 B1 | 10/2001 | Lin et al. |
| 6,348,278 B1 | 2/2002 | LaPierre et al. |
| 6,379,485 B1 | 4/2002 | Borglum |
| 6,383,678 B1 | 5/2002 | Kaneko |
| 6,403,246 B1 | 6/2002 | Mizuno |
| 6,461,751 B1 | 10/2002 | Bochm et al. |
| 6,587,766 B2 | 7/2003 | Bruckner |
| 6,599,662 B1 | 7/2003 | Chiang et al. |
| 6,641,944 B2 | 11/2003 | Kawasumi et al. |
| 6,692,861 B2 | 2/2004 | Tao |
| 6,827,832 B2 | 12/2004 | Henuset et al. |
| 6,890,672 B2 | 5/2005 | Dickman et al. |
| 2002/0015871 A1* | 2/2002 | Tao et al. ............ 429/27 |
| 2002/0015877 A1 | 2/2002 | Tao |
| 2002/0051900 A1 | 5/2002 | Okamoto et al. |
| 2002/0114990 A1 | 8/2002 | Fly et al. |
| 2003/0143440 A1 | 7/2003 | Tao et al. |
| 2004/0058203 A1 | 3/2004 | Priestnall et al. |
| 2004/0166398 A1 | 8/2004 | Tao et al. |
| 2004/0202924 A1 | 10/2004 | Tao et al. |
| 2004/0251241 A1 | 12/2004 | Blutke et al. |
| 2005/0089738 A1 | 4/2005 | Tao et al. |
| 2006/0040167 A1 | 2/2006 | Blake et al. |
| 2007/0048555 A1 | 3/2007 | Blake et al. |

FOREIGN PATENT DOCUMENTS

| | | |
|---|---|---|
| DE | 2650960 A1 | 5/1977 |
| DE | 4004220 C1 | 2/1990 |
| DE | 4004220 C1 | 4/1991 |
| DE | 19946695 A1 | 4/2000 |
| DE | 19961496 A1 | 7/2000 |
| EP | 0001351 A1 | 4/1979 |
| EP | 0333261 A2 | 9/1989 |
| EP | 0817297 A2 | 1/1998 |
| EP | 1132986 A2 | 9/2001 |
| EP | 1148566 A2 | 10/2001 |
| FR | 2020742 | 7/1970 |
| FR | 2207365 | 6/1974 |
| GB | 126766 | 5/1919 |
| GB | 940900 | 11/1963 |
| GB | 1276260 | 6/1972 |
| GB | 2278010 A | 11/1994 |
| JP | 08-96826 | 2/1985 |
| JP | 60-32254 | 4/1996 |
| WO | WO 90/02425 A1 | 3/1990 |
| WO | WO 95/09450 A1 | 4/1995 |
| WO | WO 00/77872 A1 | 12/2000 |
| WO | WO 01/28019 A2 | 4/2001 |
| WO | WO 01/80335 A2 | 10/2001 |
| WO | WO 01/97314 A1 | 12/2001 |
| WO | WO 03/001617 A2 | 1/2003 |
| WO | WO 03/044887 A2 | 5/2003 |
| WO | WO 03/067683 A2 | 8/2003 |
| WO | WO 2004/112175 A2 | 12/2004 |

OTHER PUBLICATIONS

Grant Abstract, "Novel Carbon Ion Fuel Cells," P/METC-DE-FG22-93PC93219, Duke Univ., (1993).

Grant Abstract, "Novel Carbon Ion Fuel Cells," P/PETC-FG22-93PC93219, Duke Univ.,(1993).

Gur et al., "Direct Electrochemical Conversion of Carbon to Electrical Energy in a High Temperature Fuel Cell," *J. Electrochem.*, vol. 139, No. 10 pp. L95-L97 (1992).

Lu et al., "Development of solid oxide fuel cells for the direct oxidation of hydrocarbon fuels," *Solid State Ionics*, vol. 152-153, pp. 393-397 (2002).

Weaver et al., "Direct use of coal in a fuel cell: feasibility investigation," *Chemical Abstracts*, 180031, vol. 85, No. 24, p. 146.

Yentekakis et al., "A Novel Fused Metal Anode Solid Electrolyte Fuel Cell for Direct Coal Gasification: A Steady-State Model," *Ind. Eng. Chem. Res.*, vol. 28, pp. 1414-1424 (1989).

\* cited by examiner (PRIOR ART)
Fig. 1

OXIDATION FACILITATOR

RELATED APPLICATIONS

This application is a continuation of International Application No. PCT/US04/018733 filed Jun. 10, 2004, which was published under PCT Article 21(2) in English, which claims priority to U.S. Provisional Application Ser. No. 60/477,281, filed Jun. 10, 2003. Both applications are hereby incorporated by reference.

FIELD OF THE INVENTION

The present invention is directed to fuel use in electrochemical devices and, more particularly, to fuel oxidation facilitators in connection with electrochemical devices, for example, fuel cells.

BACKGROUND OF THE INVENTION

The conversion of fuel to energy defines technology at the center of one of the most important industries in existence. Most energy conversion in this arena involves the combustion of fuel to produce mechanical, thermal, and/or electrical energy. Coal, oil, and gasoline are fuels typically used in conventional combustion technology. The combustion of these fuels (burning) involves applying enough heat to the fuel, in the presence of an oxidant such as the oxygen in air, for the fuel to undergo a relatively spontaneous and ill-defined combustive, often explosive, reaction in which chemical bonds in the fuel break and reactions with oxygen occur to produce new compounds that are released into the environment (exhaust). In the process, energy is released in the form of heat and an expansive force, which can be used to drive a piston, turbine, or other mechanical device. This mechanical energy can be used directly, e.g., to drive an automobile or propel a jet aircraft. It also can be converted into electrical energy by linking the mechanical device to an electrical generator. Or it can simply be used to provide heat, e.g., in a home.

Fuel combustion is, as noted, relatively ill-defined. That is, the precise chemistry occurring during combustion is not well known or easily controlled. What is known is that the resulting exhaust typically includes a wide variety of toxic compounds such sulfur-containing toxins, nitrous compounds, and unburned fuel droplets or particles (soot), some of which can be converted by sunlight into other toxins such as ozone, as well as a significant amount of carbon dioxide which, while not toxic, is an important greenhouse gas that many experts believe is affecting the environment.

Cutting edge research and development in the area of energy conversion generally is aimed at improving efficiency and/or reducing the emission of toxic pollutants and greenhouse gases. Fuel cells represent a significant advance in this area. Fuel cells are generally very clean and efficient, and also are very quiet, unlike most combustion engines and turbines. Fuel cells convert fuel directly into electrical energy via a relatively well-defined, controllable, electrochemical reaction that does not involve explosive combustion. In some systems, the only reaction product exhausted into the environment is water. In electrical production, no intermediate mechanical device, such as a piston engine or turbine, is needed, thus the process is generally much more efficient, since intermediate mechanical devices cause significant energy loss through friction, etc. The efficiency of conversion of fuel to mechanical energy via combustion in a piston engine is also hampered by the laws of physics; the Carnot Cycle, via which piston engines operate, determine the limit of efficiency in the conversion of heat, from combustion, into mechanical work. Significant loss of energy is unavoidable.

While fuel cell technology has been developed to some extent, it has not assumed a significant role in worldwide energy conversion. Significant improvements are likely needed for this to happen.

SUMMARY OF THE INVENTION

The present invention provides a series of techniques and methods providing various advantages in electrochemical devices, in particular fuel cells. Although the invention is described primarily in the context of fuel cells, those of ordinary skill in the art will recognize that the invention applies to other electrochemical devices including, without limitation, batteries and mixed fuel cell/battery arrangements.

In one aspect, the invention provides a series of fuel oxidation facilitators that can be used in electrochemical devices. One oxidation facilitator of the invention is constructed for use in a fuel cell that includes a fluid anode for oxidizing a fuel provided to the fuel cell. The facilitator is constructed and arranged to be integrated with other fuel cell components in a manner such that oxidation of the fuel by the anode of the cell occurs across at least a portion of the facilitator. In another embodiment, a fuel oxidation facilitator of the invention is, similarly, able to be integrated with other fuel cell components, and includes one portion constructed and arranged to physically separate fuel from anode during fuel cell operation. Fuel oxidation can occur across that portion which physically separates fuel from anode.

In another aspect, the invention provides a series of fuel cells. One fuel cell includes a compartment constructed and arranged to contain an anode that is a fluid during operation of the fuel cell. A fuel manifold is also provided, attachable to a source of fuel for the fuel cell. A fuel oxidation facilitator also is included, across which, oxidation of a fuel provided by the manifold via an anode in the anode compartment can occur during fuel cell operation.

In another embodiment, a fuel cell of the invention includes an anode, a fuel manifold attachable to a source of fuel for the cell, and a fuel oxidation facilitator across which oxidation of the fuel by the anode can occur, at a location where the anode is physically separated from fuel provided by the manifold during fuel cell operation.

In another aspect, the invention provides a series of methods. One method of the invention includes oxidizing a fuel with an oxidant via an anode of a fuel cell, at a location where the fuel and anode are physically separated from each other.

Another method of the invention involves oxidizing a gaseous fuel with an oxidant via a liquid anode of a fuel cell, while containing the liquid anode within a first compartment. The first compartment may be separate from a second compartment within which the gaseous fuel is provided, and the liquid anode is typically not free to flow or migrate into the second compartment during operation.

The subject matter of this application may involve, in some cases, interrelated products, alternative solutions to a particular problem, and/or a plurality of different uses of a single system or article.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

DETAILED DESCRIPTION OF THE INVENTION

The following patent applications and publications are incorporated by reference herein: International Patent Publication No. WO 01/80335, published Oct. 25, 2001, entitled "An Electrochemical Device and Methods for Energy Conversion"; U.S. Patent Publication No. 2002/0015877 A1, published Feb. 27, 2002, entitled "A Carbon-Oxygen Fuel Cell"; International Patent Publication No. WO 03/001617, published Jan. 3, 2003, entitled "Electrode Layer Arrangements in an Electrochemical Device"; International Patent Publication No. WO 03/044887, published May 30, 2003, entitled "An Electrochemical System and Methods for Control Thereof"; International Patent Application No. PCT/US03/03642, filed Feb. 6, 2003, entitled "Current Collectors"; U.S. Patent Application No. 60/391,626, filed Jun. 26, 2002, entitled "Current Collectors"; and U.S. Patent Application No. 60/477,281, filed Jun. 10, 2003, entitled "Oxidation Facilitator."

The present invention is directed to electrochemical devices, with particular use in fuel cells. A fuel cell is a device that converts fuel to electrical energy electrochemically, that is, without combustion of the fuel (although a fuel cell could be used in conjunction with a device deriving energy from combustion of the same fuel; most fuel cells do not). A typical, conventional fuel cell includes two electrodes, an anode and a cathode, an electrolyte in contact with both the anode and cathode, and an electrical circuit connecting the anode and the cathode from which power created by the device is drawn. In typical operation, an oxidant (e.g., oxygen, or simply air) is provided to the cathode where it is chemically reduced, e.g., to an oxygen ion, which is delivered to the anode via the electrolyte. Fuel, such as hydrogen, a hydrocarbon, and/or a carbonaceous fuel, is supplied to the anode where it reacts with the oxygen ion to form water and/or carbon dioxide, and the reaction releases electrons as the fuel is oxidized. The electrons are removed from the anode by a current collector, or other component of an electrical circuit. The overall reaction is energetically favorable, i.e., the reaction gives up energy in the form of energetic or power driving electrons from the anode, through electrical circuitry, to the cathode. This energy can be captured for essentially any purpose.

Figure 1:
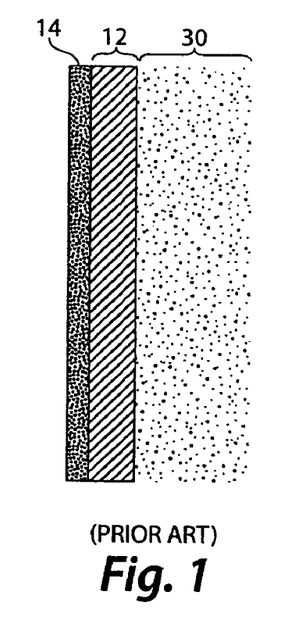
FIG. 1 is a cross-sectional view of a portion of a prior art electrochemical system.

A portion of a typical, conventional fuel cell is shown in FIG. 1. In the illustrated system, an environment containing a gaseous fuel 30 is in contact with an anode 12, which is in turn in contact with an electrolyte 14. In this arrangement, the interface between anode 12 and fuel 30 provides the area for the interaction between the anode and fuel. As fuel is oxidized, more fuel is supplied to anode 12.

Fuel cells using liquid anodes are known, and have presented new opportunities and challenges for fuel delivery. For example, liquid anodes allow fuel to be bubbled into the anode. Where fuel is bubbled into a liquid anode, the surface of the bubbles becomes the area for interaction between the anode and fuel. For example, a variety of fuel delivery options useful with liquid anodes are disclosed in International Patent Application Serial No. PCT/US02/37290 (International Publication No. WO 03/044887, published May 30, 2003), referenced above. The present invention, while not limited to use with a liquid anode-containing fuel cell, is quite useful with these devices.

The present invention provides, generally, structures and arrangements for facilitating a chemical reaction at an electrode of an electrochemical device. The invention provides particular use in facilitating oxidation of a fuel at an anode. The invention can be particularly useful in an electrochemical device including a fluid electrode (i.e., one including a substantial portion that is a liquid), for example, to contain a liquid electrode and prevent it from flowing outside of a predetermined area.

The present invention also can help improve fuel efficiency in electrochemical devices. Improving fuel efficiency is generally advantageous, but is particularly important where material tolerances in an electrochemical device may dictate operating conditions that are less than ideal for fuel efficiency. For example, in certain electrochemical devices, in order to minimize erosion of the electrolyte, voltage across cells within the electrochemical device must be maintained at a level different, e.g., higher, than that ideal for fuel efficiency. Various arrangements of the present invention can allow for voltage to be maintained at a level that minimizes erosion of electrolyte or other components, while allowing the device to operate at high fuel efficiency.

The invention provides, in certain embodiments, a fuel oxidation facilitator for use in a fuel cell. The facilitator is constructed and arranged to be integrated with other fuel cell components, and can facilitate oxidation of the fuel by the anode. Those of ordinary skill in the art will understand how an oxidation facilitator of the invention can be "constructed and arranged" to be integrated with other fuel cell components, in a wide variety of fuel cell arrangements, or arrangements of other electrochemical devices. For example, the oxidation facilitator can include integral or attached seals, brackets, flanges, passages for receiving fasteners, and/or can be fabricated so as to be easily modifiable with these or other components.

In one embodiment, oxidation of the fuel by the anode occurs at a portion of the facilitator that physically separates the anode from the fuel ("at a portion," as used herein, means at least one portion of a component, optionally at all portions, i.e., across the entire device, but not necessarily at all portions). In this embodiment the facilitator need not be the only thing that separates the anode from the fuel, i.e., other components can be positioned between the anode and the fuel, but the anode and the fuel do not physically contact each other at the portion where oxidation of fuel by the anode occurs. In another embodiment, the facilitator is constructed and arranged to be integrated with other fuel cell components such that it is between the fuel and the anode. The facilitator may prevent flow between the fuel and anode where one or both is a fluid, but also may allow fuel and anode to come into contact with each other at one or more locations where oxidation occurs. These embodiments can be provided in combination, i.e., a fuel oxidation facilitator can include portions across which oxidation occurs where fuel and anode are completely separate, and other portions across which oxidation occurs where fuel is allowed to contact anode. As used herein, "flow" means bulk movement of one species into another species or compartment, e.g., where a liquid anode and gaseous fuel are prevented from flowing into each other or into each other's compartment, the gaseous fuel does not bubble into the liquid anode, and the liquid anode does not flow into the fuel. The meaning of "flow" herein does not, however, exclude diffusion. For example, gaseous fuel may diffuse into a liquid anode, i.e., fuel molecules can become dissolved or dispersed within the liquid anode, although there may be no bulk amount of gaseous fuel within the anode (e.g., bubbles).

Fuel oxidation facilitators of the invention can define portions of fuel cell components. For example, a fuel oxidation facilitator can define a portion of an anode compartment that can at least partially contain a fluid anode within the compartment. The oxidation facilitator similarly can define a portion of a fuel compartment (and/or fuel conduit/manifold), and can serve to at least partially contain fuel. The oxidation facilitator can serve as part of the fuel compartment and/or as part of the anode compartment. It can also serve as the sole fuel cell component separating the fuel from the anode, at least one location, i.e., it can define a wall that is between and is in contact with both the fuel and the anode.

As used herein, a "fuel oxidation facilitator" is any article that can be positioned, relative to a fuel and an anode of an electrochemical device such as a fuel cell, such that the anode and fuel are able to communicate electrochemically across the facilitator, facilitating oxidation of the fuel. In one embodiment, the oxidation facilitator is ionically conductive, and able to transfer oxygen ions across it between anode and fuel, at a location where the anode and fuel are not in contact physically with each other (for example, in an arrangement where the anode and fuel are completely physically separated from each other throughout the device). Of course, where the oxidation facilitator is ionically conductive, a return electronic path will be provided, either internally of the device (where the device is a mixed ion/electron conductor), or externally, e.g., through a separate circuit or arrangement of materials.

The oxidation facilitator of the invention, and other electrochemical device components will at times be described in the context of "operating conditions of the fuel cell," or "normal fuel cell operation." These phrases will be understood by those of ordinary skill in the art, and refer to use of an electrochemical device or system under conditions for which it was intended and/or designed it to be used, or under conditions for which it would forseeably be used, for example, to generate electrical current via consumption of a fuel and/or recharging of a chemically-rechargeable electrode, as described in International Patent Publication No. WO 01/80335, noted above. These operating conditions can involve temperatures and/or voltages selected for effective and efficient fuel cell operation, including temperatures at which a metal anode is in a liquid state. Some arrangements of the invention will be described in which a "substantial portion" of an anode is a fluid, e.g. liquid, state (some anode materials suitable for use in the invention will include some gaseous material as well). "Substantial portion," when used in this context, means that a majority of the entire anode is in the recited state, under normal operating conditions of the fuel cell. Where a "substantial portion" of the fuel is a gas, this means, similarly, that a majority of the fuel is in the gaseous state.

Figure 2:
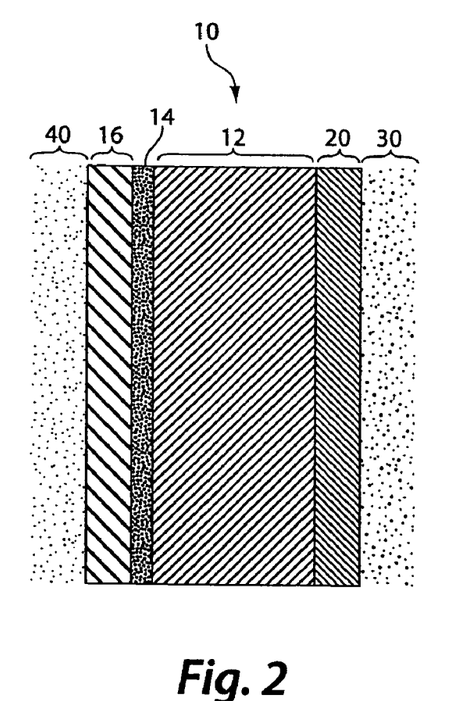
FIG. 2 is a cross-sectional view of a portion of an electrochemical system, according to one embodiment of the present invention.

Referring now to FIG. 2, one arrangement of an electrochemical device including an oxidation facilitator of the invention is illustrated schematically. In the embodiment illustrated, an electrochemical device 10 is shown to include an anode 12, an electrolyte 14 which separates anode 12 from a cathode 16, and a fuel oxidation facilitator 20 which separates anode 12 from a region 30 containing a fuel. A region 40, on the side of cathode 16 opposite electrolyte 14, contains an oxidant, such as oxygen (air can also serve as the oxidant). Where a region is described as containing a fuel or an oxidant, that region sometimes is referred to simply as "fuel" or "oxidant." It is to be understood that fuel or oxidant can be provided in "neat" or pure form, or can be provided in a carrier or admixed with any other species that does not serve as a fuel or oxidant, respectively.

In the arrangement illustrated, fuel 30 is in direct contact with oxidation facilitator 20, which is in direct contact with anode 12, which is in direct contact with electrolyte 14, which is in direct contact with cathode 16, which is in direct contact with oxidant 40. It is to be understood, in connection with the arrangement of FIG. 2 or any other arrangement of the invention, that any suitable intermediary components can be positioned between any of the illustrated components so long as the fuel cell remains operative. Those of ordinary skill in the art are aware of such auxiliary components which could be introduced. Examples include those described in International Patent Publication No. WO 03/001617, referenced above.

As will become apparent from the description that follows, the arrangement schematically illustrated in FIG. 2 can take any of a wide variety of structural, geometric configurations. The layers (oxidation facilitator, anode, etc.) are shown to be of uniform thickness and the boundaries between the various layers are essentially straight, but it is to be understood that thicknesses of components can change from those illustrated, can vary within components, and borders between components can be non-planar and of essentially any shape.

Figure 3:
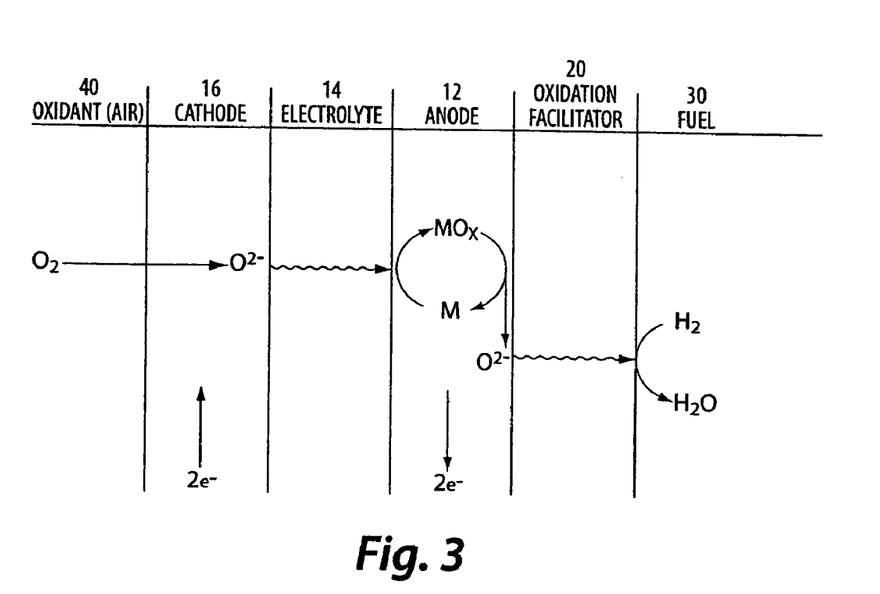
FIG. 3 represents electrochemistry occurring via a cathode, electrolyte, anode, oxidation facilitator, fuel, and oxidant, according to one embodiment of the invention.
Figure 4:
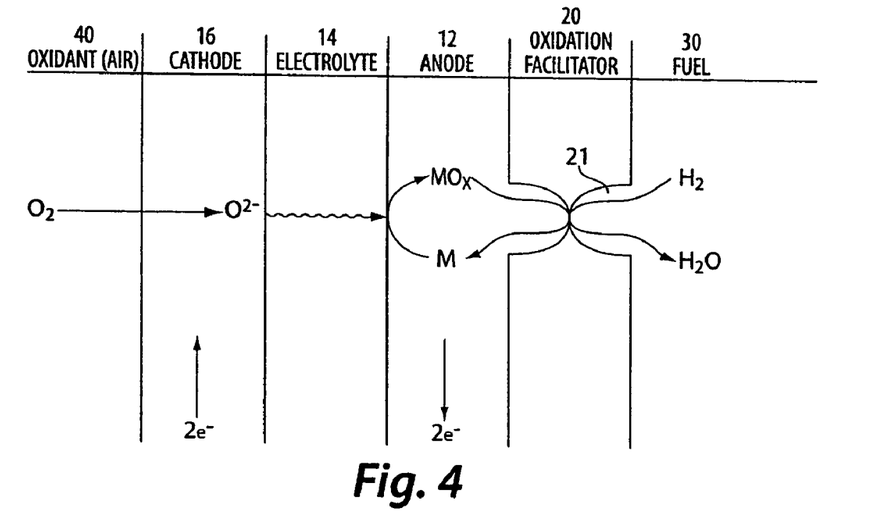
FIG. 4 represents electrochemistry occurring via a cathode, electrolyte, anode, oxidation facilitator, fuel, and oxidant, in accordance with another embodiment of the invention.

Referring now to FIGS. 3 and 4, electrochemistry proposed to occur during operation of a fuel cell, including an oxidation facilitator, according to one embodiment of the invention, is represented. It is to be understood that the chemistry represented in FIGS. 3 and 4 and the accompanying description, and elsewhere herein, is representative of the inventors' understanding of chemistry that occurs in connection with the invention, but that slight differences may exist in how and where chemical reactions take place. In FIG. 3, an oxidant 40, which can be an oxygen-containing fluid such as air, is supplied to cathode 16. Electrons are delivered to cathode 16 from an electrical source (not shown) which typically includes a circuit including both the cathode and anode. At cathode 16, oxidant is reduced by electrons (2 in this example) supplied from the circuit to form oxygen ions which permeate electrolyte 14 and are delivered to anode 12. In the embodiments illustrated, a metal (M) is shown for purposes of illustration. Where "M" or "metal" is used herein, it is to be understood that the metal can be an alloy of different metals as well. The anode can be a liquid metal. Metal atoms in the anode cycle between two or more oxidation states including metal (M) and various species of metal oxide ($MO_x$). As illustrated, the anode can absorb oxygen ion from electrolyte 14 and incorporate it into a metal oxide species which, at oxidation facilitator 20, releases oxygen ion in exchange for electrons which are delivered from anode 12 into electrical circuitry. Oxygen ions can permeate the oxygen facilitator and oxidize a fuel 30 (hydrogen is shown, although those of ordinary skill in the art will recognize a wide variety of other fuels can be used), releasing electrons. The reaction shown in FIG. 3 (as well as that shown in FIG. 4) is energetically favorable, thus power can be drawn from an electrical circuit connecting anode 12 with cathode 16. In the embodiment illustrated, the only exhaust released is water, along with any unconsumed fuel (which can be easily recovered for further use).

In the arrangement of FIG. 3, oxygen facilitator 20 completely physically separates anode 12 from fuel 30. That is, no atoms of the fuel are allowed to be brought into physical proximity with atoms of the anode that would allow direct electrochemical reaction therebetween. Instead, the oxygen facilitator can transport ions from the anode to the fuel, and can transport electrons from the reaction between oxidant and fuel to the anode, or the oxygen facilitator can otherwise facilitate electrochemical communication between a physically separated anode and fuel. In this case, facilitator 20 typically is a mixed ion/electron conductor.

Referring now to FIG. 4, the arrangement of FIG. 3 is illustrated, with the exception that oxygen facilitator 20 includes a pore 21 passing completely through the facilitator and allowing physical contact between fuel 30 and anode 12. In this arrangement, direct reaction between an oxidized species of anode 12 (metal oxide, as illustrated) and fuel, results in an oxidation product of the fuel (delivered to exhaust, described below) and release of electrons which are captured by the anode and routed to external circuitry. Additionally, in this arrangement, some $MO_x$ may be able to exist in gaseous state and diffuse into and/or admix with gaseous fuel, facilitating reaction.

In one set of embodiments pore 21 (and a plurality of similar pores in the oxidation facilitator) are selected to be of dimensions allowing sufficient physical communication between the anode and fuel to allow chemistry shown in FIG. 4 to occur, while preventing flow of a fluid fuel into the anode or a fluid anode into the fuel. The dimension of pore 21 can be selected based upon bore (cross-sectional dimension), length, or a combination (aspect ratio) by those of ordinary skill in the art, taking into account viscosity of the fuel and/or anode, and/or compatibility between the oxidation facilitator and the fuel, the oxidation facilitator and the anode, and/or the fuel and the anode (where "compatibility" involves mutual attraction, or lack thereof, involving characteristics analogous to hydrophilicity or hydrophobicity).

In connection with the arrangement illustrated in either FIG. 3 or FIG. 4, where oxidation facilitator 20, with or without pores that pass entirely through the facilitator, can facilitate electrochemical communication between a physically separated anode and fuel (e.g., as a mixed ion/electron conductor), an oxygen gradient is typically created across the facilitator during use, with concentration decreasing from the anode side to the fuel side. Thus, an equilibrium between metal and metal oxide favors metal toward the fuel side of the facilitator, which serves to contain metal within the anode compartment; metal does not migrate, physically or via electrochemical reaction, outside of the compartment.

Figure 5:
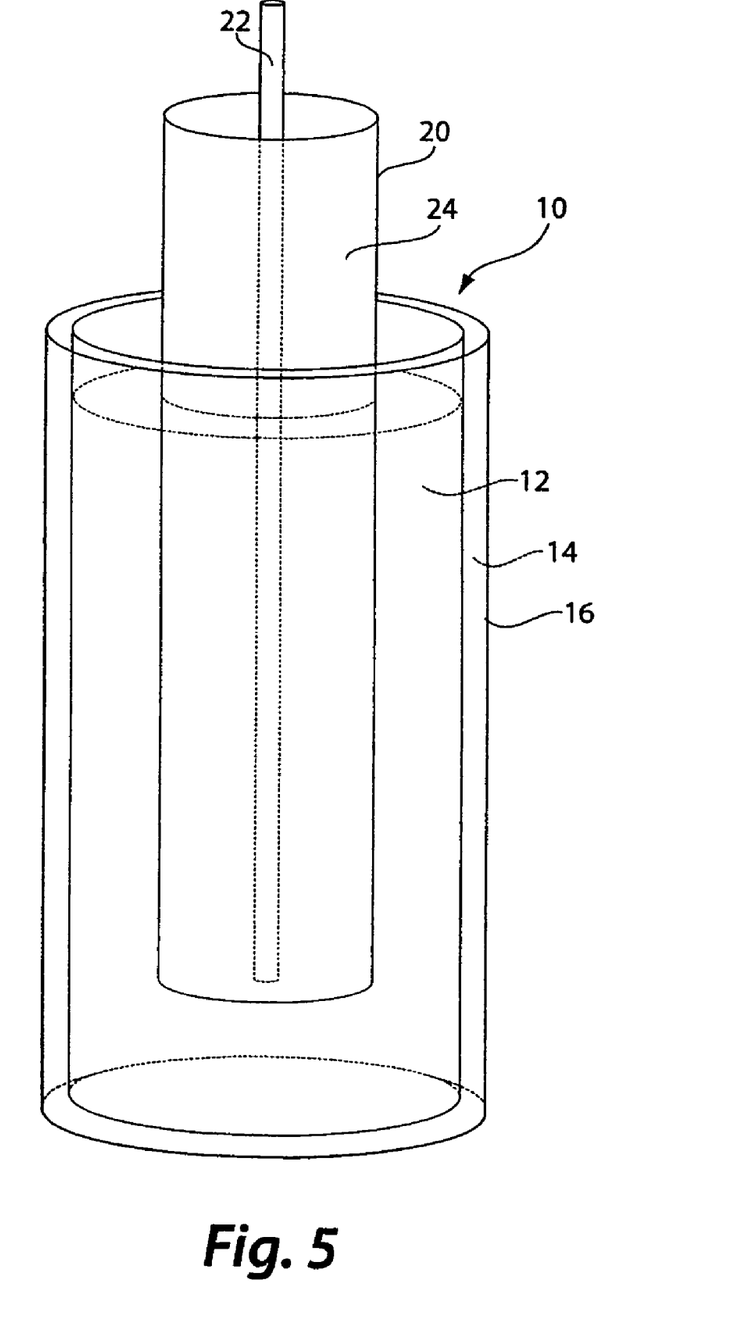
FIG. 5 is a perspective, plan view of an electrochemical device, according to one embodiment of the present invention.

Referring now to FIG. 5, a schematic illustration of one general geometric arrangement of an electrical device of the present invention illustrated. In FIG. 5, electrochemical device 10 is arranged in a substantially cylindrical configuration including an outer, cylindrical cathode 16, a cylindrical electrolyte 14 inside and in contact with cathode 16, a liquid anode 12 contained by electrolyte 14, a cylindrical oxidation facilitator 20 immersed within a portion of anode 12, thereby defining at least one compartment within which anode 12 is contained, and a fluid delivery conduit 22 positioned to deliver fuel to oxidation facilitator 20. As illustrated, fuel delivery conduit introduces fuel into a cylindrical container defined by oxidation facilitator 20.

Figure 6:
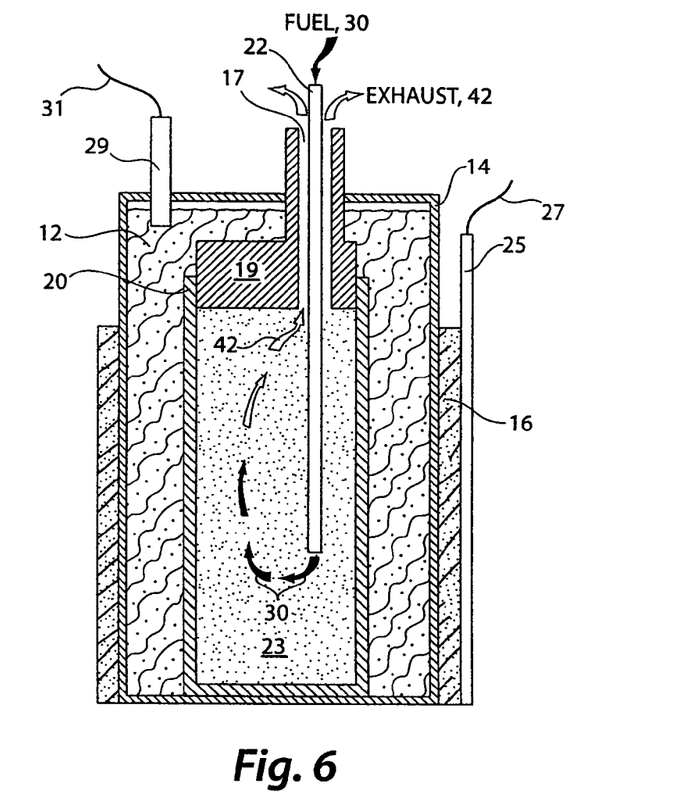
FIG. 6 is a cross-sectional view through an electrochemical device similar to that shown in FIG. 5, in the plane of the figure, according to another embodiment of the present invention.

Referring now to FIG. 6, the generalized arrangement of FIG. 5 is illustrated in cross-section, in greater detail. The difference in perspective (component size) between FIGS. 5 and 6 is representative of the variety of configurations and arrangements possible. In FIG. 6 oxidation facilitator 20 is of a substantially cylindrical shape with a closed bottom and an open top, although as would be readily understood, the bottom can be formed of any material and/or the facilitator can be positioned such that the bottom has access to the anode, as shown in FIG. 5.

In the embodiment illustrated, oxygen facilitator 20 is inside of and rests on the bottom of substantially cylindrical electrolyte 14, and cylindrical electrolyte 14 has a closed top and bottom, which may be made of the same or different material as the electrolyte material.

The open top of cylindrical oxidation facilitator 20 is substantially completely sealed by a plug 19 which includes an opening 17 therein, allowing communication between the interior of a cylindrical compartment formed by facilitator 20 and the environment external to the device. Fuel delivery conduit 22 passes through opening 17 and extends into the cylindrical compartment defined by facilitator 20, which can thereby define a fuel manifold or reaction chamber. Fuel conduit 22 does not completely block opening 17, but allows for escape of exhaust through space 17 defined between the exterior of fuel conduit 22 and the interior of the passage of plug 19. Fuel conduit 20 can be positioned (e.g. centered) within passage 17 by essentially any routine technique. Passage 17 thus defines an exhaust passage which can be connected to an exhaust conduit (not shown).

Facilitator 20 and plug 19 can be made to define a fluid-tight (other than passage 17) device which, positioned within a space defined by the interior of cathode 14, does not completely fill the space, and at least a portion of plug 19 extends outside of (above, as illustrated) the space. The remainder of the space can be filled with an anode 12 (optionally liquid) which is contained by electrolyte 14 and which is not allowed to flow into the compartment defined within facilitator 20. Stated another way, the combination of facilitator 20 and plug 19 is placed within a compartment defined by cathode 14, and some or all of the remaining space within the compartment is filled with liquid anode 12. In the embodiment illustrated facilitator 20 in part defines a compartment constructed and arranged to contain an anode that is a fluid during operation of the cell, and also defines, in part, the fuel manifold. The anode physically contacts electrolyte 14 and facilitator 20, and the facilitator prevents any flow of fuel from the fuel manifold into the anode compartment, and also prevents any flow of anode from the anode compartment into the fuel manifold.

Cathode 16 is arranged cylindrically to surround electrolyte 14, as illustrated, and is in contact with a cathode current collector 25, addressed by an electrical lead 27 communicating with an electrical circuit (not shown). An anode current collector 29 is in electrical contact with (e.g. submerged within) anode 12, and is addressed by an electrical lead 31 which communicates with the electrical circuit.

An oxidant, such as air, is allowed to contact cathode 16. Fuel (30) is delivered from a source that is not shown. In some arrangements, exhaust (42) can simply diffuse into air, but in most arrangements exhaust will be collected in an exhaust conduit, not shown, and treated in an environmentally sound manner. The exhaust typically will contain only water and unspent fuel (which can be re-used), or water, unspent fuel, and carbon dioxide.

It is to be understood that the arrangement of FIGS. 5 and 6 is but one example of a fuel cell that makes use of an oxidation facilitator. Many structural arrangements other than those disclosed herein, which make use of and are enabled by the present invention, will be apparent to those of ordinary skill in the art, and some are disclosed herein. For example, many other arrangements for forming manifold 23, delivering fuel to the manifold, and removing exhaust from the manifold are possible other than the arrangement including plug 19, conduit 22, passage 17. For example, oxidation facilitator 20 could form an enclosed chamber by itself permeated only by a delivery conduit 22, and a separate exhaust conduit near conduit 22 or at the other end of the chamber relative to conduit 22.

A variety of modifications can be made to the arrangement of FIG. 6 to increase or decrease thickness of any component and/or change the relative surface area of contact between any two components in comparison to the surface area of contact between another other two components. For example, the "thickness" of anode 12 can be varied simply by varying the external diameter of oxidation facilitator 20 and/or the internal diameter of electrolyte 14. As an example of relative surface area variation, the surface area of facilitator 20 exposable to anode 12 can be decreased, relative to the surface area of electrolyte 14 exposed to anode 12, by decreasing the height of facilitator 20 and/or decreasing its radius. The same can be increased by decreasing the fluid level of anode 12 within the container defined by electrolyte 14, or by reversing the relative positions of facilitator 20 and electrolyte 14. In the latter arrangement, facilitator 20 defines a cylindrical compartment within which electrolyte 14 resides, the space between the two filled (or partially filled) by anode 12. In this arrangement, oxidant is delivered within electrolyte 14 (similar to the delivery of fuel as shown in FIG. 6) and fuel is delivered to the exterior of facilitator 20 by a manifold arrangement easily constructible by those of ordinary skill in the art (or the entire arrangement can be placed within a fuel environment). Cathode 16 would be placed within electrolyte 14 in the "reversed" arrangement.

The ability to vary the thickness of the elements of an electrochemical device according to the invention and/or adjust the relative areas of surface contact between components can impact the efficiency of the device. For example, portions of the system which are of relatively low conductivity, or are otherwise rate limiting, may be decreased in thickness. Similarly, it may be possible to reduce the amount of higher cost materials used. In particular, embodiments of the present invention allow a liquid anode to be contained by a oxidation facilitator, in turn allowing the anode to be kept relatively thin (e.g., significantly, proportionately thinner than as illustrated in FIG. 6). Reduction in anode thickness can reduce the resistance of the electrochemical device, and reduces the amount of anode material required, improving efficiency and reducing cost.

The invention allows for modification of design that can be used to affect device power, battery storage capacity, or both. For example, by increasing surface area of contact between the oxidation facilitator and the fuel and anode, continuous power output is improved. By increasing the amount of anode present, battery storage may be increased, e.g. in embodiments where a rechargeable anode is used. Each of these can be controlled, independently of each other, e.g. by changing the radius of the oxidation facilitator (where cylindrical), and/or designing the oxidation facilitator in other ways to geometrically create more surface area (e.g. with a wavy, jagged, and/or porous facilitator), and/or by increasing or decreasing the thickness of the anode, as discussed above. These changes can be useful when designing different fuel cells for different uses requiring more or less power and/or more or less battery storage capacity, e.g., for home power use, commercial or industrial use, automobile use, different climates, etc.

As noted above, oxidation facilitation device 20 can be any structure or material that can place the anode and fuel in oxidative communication, i.e., an arrangement in which the anode can facilitate oxidation of the fuel. Purposes served by the oxidation facilitator can include improving fuel efficiency, maximizing surface area between fuel and anode at which oxidation can occur (whether fuel and anode are allowed to physically contact each other or not), defining a portion of a fuel compartment (manifold), defining a portion of an anode compartment, preventing anode gases from mixing with fuel and/or exhaust, preventing fuel and/or exhaust from being introduced into the anode, and/or other functions.

Where oxidation facilitator 20 is effective in improving fuel efficiency it can do so, at least in part, by increasing the effective surface area for interaction between the anode and the fuel, and/or by increasing the reaction rate between oxygen ions in the anode and the fuel. In one embodiment, the reaction rate may be increased by use of a catalyst (examples are provided below).

Where the oxidation facilitator is intended to increase fuel efficiency by increasing the effective area for interaction between the anode and cathode, this may be accomplished physically, ionically, or both. For example, increasing the effective area for interaction may be performed physically by providing a framework that improves the interfacial area between the anode and fuel. In one such embodiment, oxidation facilitator 20 may comprise an open structure through which the anode and fuel can contact one another (represented by chemistry shown in FIG. 4). For example, oxidation facilitator 20 may be porous. As used herein, "porous" means containing a plurality of openings; this definition includes both regular and irregular openings, as well as openings that extend all the way through a structure as well as those that do not.

Figure 7:
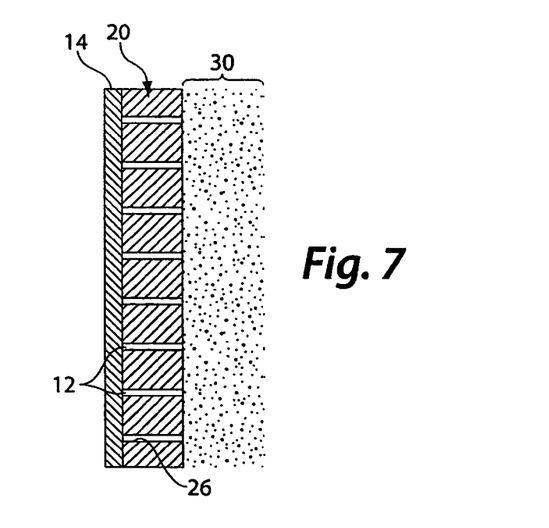
FIG. 7 is a cross-sectional view of a portion of an electrochemical system, according to one embodiment of the invention.

Porous oxidation facilitators may take many forms. One example of a oxidation facilitator comprising a porous structure is illustrated in FIG. 7, along with electrolyte 14. In this example, porous oxidation facilitator 20 is used as a support for anode 12, which is completely contained within pores 26 of the oxidation facilitator. As illustrated, in this embodiment pores 26 extend all the way through oxidation facilitator 20 and the fuel and anode are placed in direct physical contact, allowing electrochemistry to occur as illustrated in FIG. 4. Typically, such pores will be irregular, though they also may be regular as illustrated, depending, for example, on how they are formed.

In the embodiment of FIG. 7, anode 12 can be a liquid or solid anode and has been applied to oxidation facilitator 20 so as to occupy pores 26. This arrangement allows a liquid anode to be effectively treated as a solid anode in terms of design and fuel supply in an electrochemical device. The ability to use a liquid anode in a wider variety of geometries may impact the electrochemical device in many ways, from fuel efficiency to manufacturing expense.

In certain embodiments, anode 12 may not occupy all of pores 26 of oxidation facilitator 20, allowing fuel to at least partially penetrate the oxidation facilitator. This may present an irregular interface between the fuel and the anode, improving the interfacial area. This may be particularly true where anode 12 is wholly or partially coated on the inside of the pores.

Figure 8:
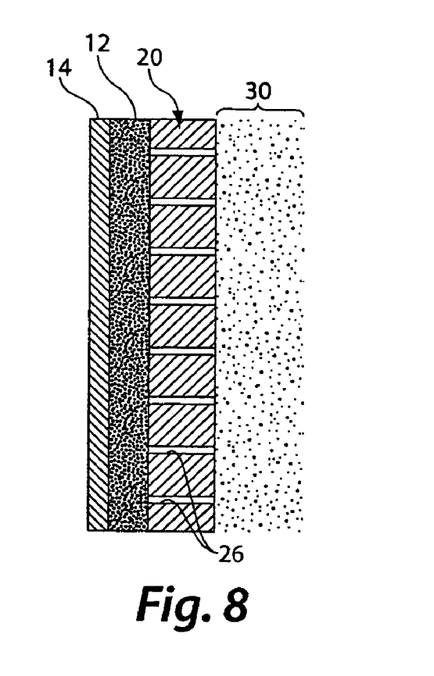
FIG. 8 is a cross-sectional view of a portion of an electrochemical system, according to another embodiment of the present invention.

Another oxidation facilitator 20 arrangement of the invention is illustrated in FIG. 8. In this example, a porous oxidation facilitator 20 is positioned between the anode 12 and the fuel 30; pores 26 allow the anode and the fuel to interact, and facilitate electrochemistry, e.g. as illustrated in FIG. 4. This embodiment may allow a liquid anode to be contained in an analogous manner to that described with reference to FIG. 7, increasing design freedom. In a manner also similar to that described with reference to FIG. 7, anode and fuel may both enter pores in the oxidation facilitator to varying degrees and the irregularity of the interface thus created may effectively increase the area for interaction between the two. In one embodiment, no flow occurs between the fuel and anode. That is, fuel does not flow into the region identified as containing anode 12, and anode does not flow into the region identified as containing fuel 30. In another arrangement, flow may be allowed to occur or can be purged via a pressure differential across the oxidation facilitator. For example, where anode 12 is a liquid, fuel may be delivered through pores 26, effectively rendering the fuel into numerous small bubbles in the anode. The smaller the bubbles, the higher the surface area to volume ratio, and, thus, the greater the surface area for interaction per unit fuel will be. This arrangement may also allow bubbles to be introduced into a larger percentage of the anode. Both the increased area for interaction and more complete use of the anode may result in increased fuel efficiency. This is particularly true in comparison to a single fuel delivery tube delivering fuel directly to the anode, which delivers fuel only to a single portion of the anode and will typically form relatively large bubbles. Where fuel is bubbled into the anode while the device is in operation, bubbles will emerge from the anode containing exhaust and any unspent fuel.

Figure 9:
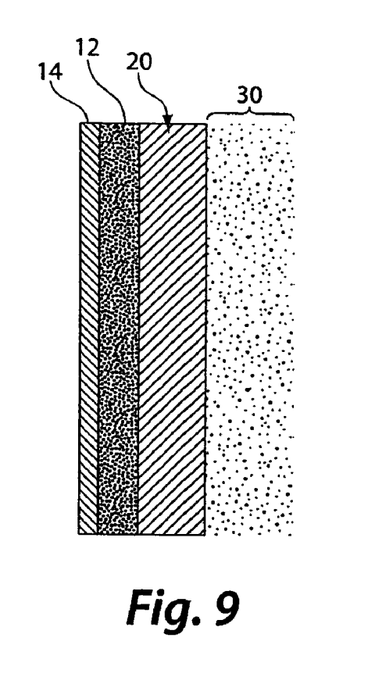
FIG. 9 is a cross-sectional view of a portion of an electrochemical system, according to another embodiment of the present invention.

An arrangement of the invention in which the oxidation facilitator completely physically separates anode from fuel is illustrated in FIG. 9. In this embodiment, the anode 12 is physically separated from the fuel, but remains in oxidative communication with the fuel, for example by allowing oxygen ions to travel ionically through facilitator 20. Electrochemistry that can be involved in the arrangement of FIG. 9 is illustrated in FIG. 3. The arrangement of FIG. 9 also is generally more useful when anode 12 is somewhat volatile at operating temperatures, i.e., when the anode will produce gas, because a non-porous facilitator can more easily contain the anode.

In one embodiment, the oxidation facilitator includes at least one portion allowing physical contact between fuel and anode (while, optionally, preventing flow of either therebetween), and also includes at least one portion facilitating oxidation of the fuel by the anode at a location where the anode is physically separated from the fuel. For example, a porous oxidation facilitator can be used, but made of material across which oxidation of fuel can occur without pores. In such an arrangement, oxidation will occur across the device (without physical contact between the fuel and anode), and also via physical contact between fuel and anode facilitated by pores.

Figure 10:
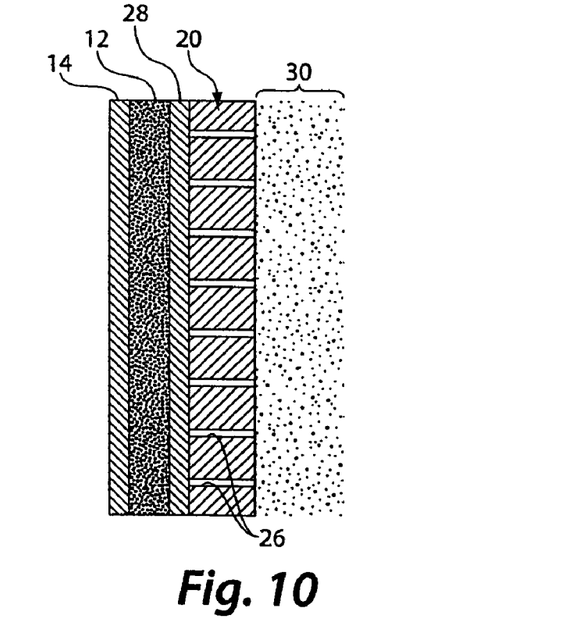
FIG. 10 is a cross-sectional view of a portion of an electrochemical system, according to another embodiment of the present invention.

In other embodiments, there may be no physical contact between the anode and the fuel, but pores may be used for other reasons. For example, pores may be used to increase the interfacial area between the anode and oxidation facilitator and/or the fuel and the oxidation facilitator. For example, the embodiment illustrated in FIG. 10 has a portion of oxidation facilitator 20 that includes pores 26 and a portion that comprises a solid layer 28 (that is, the pores penetrate partially, but not fully, through the oxidation facilitator). In the embodiment illustrated, the pores face the fuel side and increase the interfacial area between the fuel and the oxidation facilitator. In another arrangement (not illustrated), pores can face the anode, but not the fuel. In still another arrangement pores can penetrate from the fuel side into the facilitator, and also from the anode into the facilitator, but those pores do not meet and none of the pores extend all the way through the facilitator.

Figure 11:
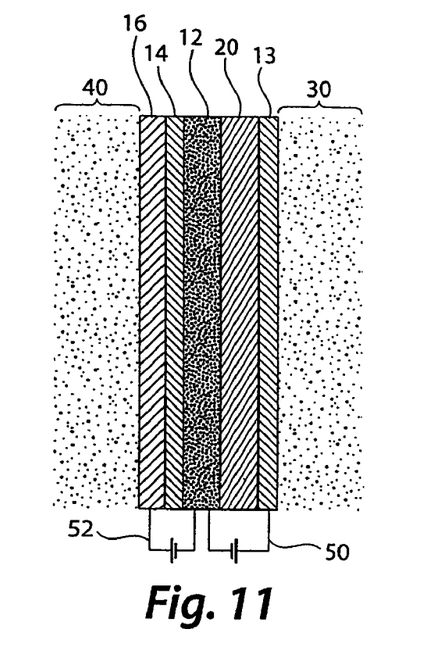
FIG. 11 is a cross-sectional view of a portion of an electrochemical system, according to another embodiment of the present invention.

In one embodiment of the invention, the rate of oxidation of fuel via an oxidation facilitator is manipulated electronically. For example, an electrical potential can be applied across the facilitator to drive oxygen ions from the cathode through the oxidation facilitator toward the fuel. One arrangement of this embodiment is illustrated in FIG. 11, in which facilitator 20 is in contact with an electrode 13 (such as a conventional solid anode material) on the side of the facilitator opposite that of anode 12. Electrode 13 can be a mixed conductor having high electronic conductivity, for example. In operation, a potential is applied across facilitator 20, between electrode 13 and anode 12, via auxiliary circuit 50, to drive oxygen ions from anode 12 across facilitator 20 to interact with fuel 30. While electrode 13, as illustrated, lies between facilitator 20 and fuel 30, of course it does not isolate the fuel from the facilitator. For example, a porous electrode 13 can be used or other openings can exist between the fuel and the facilitator. Other arrangements are known to those of ordinary skill in the art for providing a potential across facilitator 20.

Controlling the potential and/or current across a oxidation facilitator may also be useful to control the overall voltage of an electrochemical device. This may be useful where the ideal voltage for fuel efficiency is not the same at the desired overall voltage, for example for corrosion prevention reasons. The embodiment illustrated in FIG. 11 may also be used for this purpose. For example, power may be drawn from the electrochemical device at circuit 52 while power is supplied to the oxidation facilitator at circuit 50, providing an optimal overall voltage to the cell. By way of illustration, if 1.0 volts is produced between the cathode and anode through circuit 52, and −0.3 volts is applied at circuit 50 to drive migration, then the device provides an overall net voltage of 0.7 volts. This amounts to driving enough oxygen ions through the oxidation facilitator to optimally consume fuel.

Electrochemical devices of the present invention may be any kind of electrochemical device including fuel cells, batteries, and dual function devices, such as electrochemical devices comprising chemically rechargeable anodes disclosed in International Patent Publication No. WO 01/80335, referenced above. As described above, electrochemical devices according to the present invention may also have a wide variety of geometries including cylindrical, planar and other configurations. An electrochemical device according to the present invention may be combined with additional electrochemical devices to form a larger device or system. In some embodiments this may take the form of a fuel cell stack. Where more than one electrochemical device is combined, the devices may all be devices according to the present invention, or one or more devices according to the present invention may be combined with other electrochemical devices, such as conventional solid oxide fuel cells.

Various components of the invention can be fabricated by those of ordinary skill in the art from any of a variety of components. Components of the invention can be molded, machined, extruded, or formed by any other suitable technique, those of ordinary skill in the art are readily aware techniques for forming components of devices herein.

Fuel and/or oxidant conduits and manifold can be constructed of ceramic, stainless steel or other high-temperature steel, chromium and/or cobalt alloys. Other commercial alloys including iron, chrome, nickel, cobalt, and/or other spices may be useful, such as Inconnels™, or essentially any material that will not destructively interfere with the device or be easily corroded. These components typically are constructed of non-reactive materials, that is, materials that do not participate in any electrochemical reaction occurring in the device. The interior surfaces of conduits can be coated with an anti-coking agent, and/or a conduit can be constructed at least in part of an anti-coking agent, as described in International Patent Publication No. WO 03/044887, referenced above. Of course, all components should be fabricated of material selected to operate effectively at the intended temperature (and temperature variation) to which the device will be exposed. Where a plug (e.g., plug 19 in FIG. 6) is used, it typically is fabricated from a non-reactive material such as alumina and/or zirconia.

An oxidation facilitator may be constructed of any material or materials that are able to be formed into the desired structure, and/or have the desired conductivity, and/or are sufficiently durable for use in the intended operating conditions of the electrochemical device. As noted above, the oxidation facilitator may or may not be ionically conductive, and may or may not be porous. The facilitator also may include a catalyst that lowers the activation energy for oxidation of fuel, and/or reforming of fuel.

In certain embodiments, a oxidation facilitator may be constructed of ceramic materials. YSZ is one suitable composition for use in a oxidation facilitator in certain embodiments. "YSZ," as used herein, refers to any yttria-stabilized zirconia material, for example, $(ZrO_2)(HfO_2)_{0.02}(Y_2O_3)_{0.08}$. YSZ, especially if not compounded with an ionically-conductive material, is primarily useful in embodiments where physical contact between the anode and fuel is desired, for instance because YSZ has low electronic conductivity, and electrons released by the reaction between oxygen and fuel cannot return to the anode through the YSZ. Another suitable ceramic material is alumina. Those of ordinary skill in the art will recognize other non-ionically-conductive materials suitable for use in fabrication of the oxidation facilitator. Where these materials are used solely, they typically will allow physical contact between fuel and anode, for example via the porous arrangement described above.

For embodiments in which the fuel and anode are kept partially or completely physically separate from each other (including the arrangements shown in any of FIGS. 3, 4, 8, 9, and all others), it can be useful to use an ionically-conductive material and/or material able to conduct electrons. One example includes YSZ treated to allow it to conduct electrons, for example, YSZ doped with a metal such as tin, or another suitable dopant. In such a case, the oxidation facilitator typically is selected to be ionically conductive as well and, in such a case, a mixed ion/electron conductor can be selected. An example of a suitable mixed ion/electron conductor is YSZ/LCC, compounded in any of a variety of ratios selectable by those of ordinary skill in the art to achieve a desired balance of conduction. Other non-limiting examples include doped cerium oxide, including CGO (gadolinium-doped cerium oxide), CYO (yttrium-doped cerium oxide), SDC (samarium-doped cerium oxide), YSZ doped with a metal such as nickel, or the like. Typical dopant levels may be on the order of 10-20%, for example, CGO typically includes 10-20% gadolinium, and is a mixed conductor at temperature at and above about 600 degrees Celsius. CGO may also have the added benefit of acting as a catalyst for reduction of oxide species. Use of an oxidation facilitator that is a mixed ion/electron conductor can be advantageous in that it can effectively increase the interfacial area by re-ionizing oxygen and allowing it to be diffused into the mixed ion conductor. In such an embodiment, the interfacial area becomes the entire surface of the oxidation facilitator.

The oxidation facilitator also may include one or more catalysts to facilitate oxidation of fuel, reforming of fuel, and/or another purpose. Those of ordinary skill in the art are capable of selecting suitable catalysts for these purposes, and immobilizing them on a substrate defined by the oxidation facilitator. Examples include platinum, ruthenium, nickel, and doped or undoped cerium oxide.

Fuel may be delivered to a oxidation facilitator in any manner that provides sufficient fuel to the needed locations. The nature of the fuel delivery may vary with the type of fuel. For example, solid, liquid, and gaseous fuels may all be introduced in different manners. A variety of fuel delivery options useful with liquid anodes are disclosed in International Patent Publication No. WO 03/044887, referenced above. The fuel delivery techniques taught by this application may be modified to supply fuel to the oxidation facilitator, rather than directly to the anode. For example, in the embodiment illustrated in FIGS. 5 and 6, fuel delivery path 22 delivers fuel into fuel chamber 24. Fuel delivery paths could also enter the fuel chamber from other directions. For example, the fuel could be introduced into the bottom of the fuel chamber, via a delivery conduit passing through the bottom wall(s) of the device. The placement of the fuel delivery path may also vary with the arrangement of the oxidation facilitator and fuel chamber, if any. For example, the oxidation facilitator could be reversed compared to that shown on FIG. 5, such that the open side faces downward. In this case, the fuel delivery path may enter the fuel chamber from the bottom. The fuel delivery conduit can be made of alumina, in one embodiment.

Figure 12:
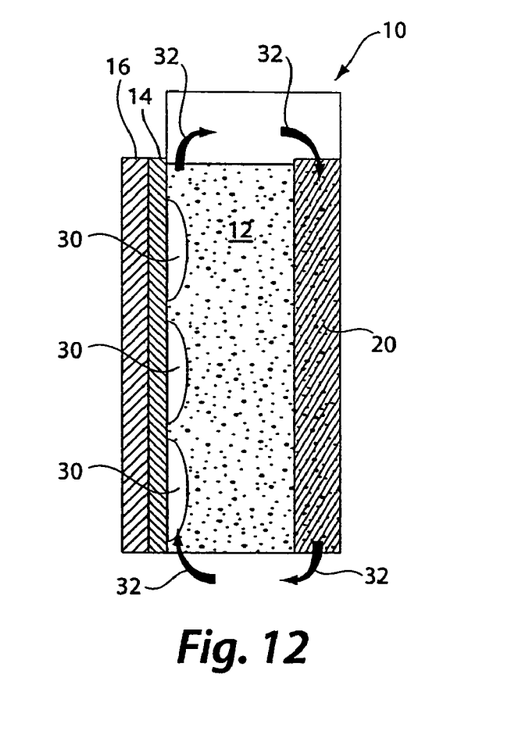
FIG. 12 is a cross-sectional view of a portion of an electrochemical system, according to another embodiment of the present invention.

Fuel may be delivered to a oxidation facilitator in such a manner as to inhibit clogging or coking. Potentially suitable strategies for reducing coking are disclosed in U.S. application Ser. No. 10/300,687 and International Application No. PCT/US02/37290 (International Publication No. WO 03/044887, published May 30, 2003.) Fuel which is prone to coking may also be reformed prior to introduction into the electrochemical device. In addition, the use of a oxidation facilitator provides additional options for inhibiting coking, for example where a catalyst capable of reforming the fuel may be introduced into the oxidation facilitator, eliminating the need for external reformation.

Where coking is an issue, fuel may also be reformed by the anode. For example, where the anode is a liquid anode, the fuel may be introduced into the anode. Fuel that is not consumed to produce electricity in the anode may be reformed by the relatively high temperatures of the anode. The reformed fuel may then pass out of the anode via a oxidation facilitator, where more of it can react with the anode, increasing fuel efficiency of the electrochemical device. An example of such an embodiment is illustrated in FIG. 12. In the illustrated embodiment, fuel 30 flows through electrochemical device 10 as indicated by flow arrows 32. Specifically, fuel 30 is bubbled up one side of the electrochemical device and then enters oxidation facilitator 20. The fuel passes down through oxidation facilitator 20 and exits the electrochemical device. Fuel is reacted both within the anode and the oxidation facilitator. Other components of the invention including cathode, anode, electrolyte, current collectors, leads, conduits, etc., can be selected by those of ordinary skill in the art from readily available materials, and in most cases, the selection is not critical to the invention except with respect to uses described above. As an example, components can be selected as described in the following documents, each incorporated herein by reference: U.S. patent application Ser. Nos. 09/033, 923; 09/837,864; 09/819,886; 10/300,687; International Patent Application Serial Nos. PCT/US03/03642; PCT/US02/37290; PCT/US02/20099; and PCT/US01/12616.

The anode, cathode, current collectors, electrolyte, circuitry, and other components can be selected by those of ordinary skill in the art from among known components, as well as those described in any of International Patent Publication No. WO 01/80335, U.S. Patent Publication No. 2002/0015877 A1, International Patent Publication No. WO 03/001617, International Patent Publication No. WO 03/044887, International Patent. Application No. PCT/US03/03642, or U.S. Patent Application No. 60/391,626, each referenced above. Specific examples follow, but the invention is not to be considered limited to these.

The anode can be a rechargeable anode, as taught in International Patent Publication No. WO 01/80335, referenced above, and can be selected from among metal or metal alloy anodes that are capable of existing in more than two oxidation states or in non-integral oxidation states. Certain metals can be oxidized to one or more oxidation states, any one of these states being of a sufficient electrochemical potential to oxidize the fuel. Conversely, if that metal is oxidized to its highest oxidation state, it may be reduced to more than one lower oxidation state (i.e., at least one having a higher oxidation state than neutral) where the anode is capable of functioning in any of these states. Alternatively, a metal oxide or mixed metal oxide may collectively oxidize fuel where metal ions are reduced by formal non-integer values.

Examples of anodic material that can be used to form the anode, or compounded with other materials to define an anode, include liquid anodes (that is, a material that is a liquid at operating temperatures of the device). In one embodiment, the device is operable, with the anode in a liquid state, at a temperature of less than about 1500° C., at a temperature of less than about 1300° C., at a temperature less than about 1200° C., at a temperature less than about 1000° C., or at a temperature less than about 800° C. By "operable," it is meant that the device is able to generate electricity, either as a fuel cell or as a battery with the anode in a liquid state, and the anode may not necessarily be a liquid at room temperature. It is understood by those of ordinary skill in the art that anodic temperature can be controlled by selection of anode materials or in the case of an alloy, composition and percentages of the respective metal components, i.e., composition can affect a melting point of the anode. Other non-limiting exemplary operating temperature ranges include a temperature between about 300° C. to about 1500° C., between about 500° C. to about 1300° C., between about 500° C. to about 1200° C., between about 500° C. to about 1000° C., between about 600° C. to about 1000° C., between about 700° C. to about 1000° C., between about 800° C. to about 1000° C., between about 500° C. to about 900° C., between about 500° C. to about 800° C., and between about 600° C. to about 800° C.

The anode can be a pure liquid or can have solid and liquid components, so long as the anode as a whole exhibits liquid-like properties. Where the anode is a metal, it can be a pure metal or can comprise an alloy comprising two or more metals. In one set of embodiments, the anodic material is selected so as to have a standard reduction potential greater than −0.70 V versus the Standard Hydrogen Electrode (determined at room temperature). These values can be obtained from standard reference materials, or measured by using methods known to those of ordinary skill in the art. The anode can comprise any one or more than one of a transition metal, a main group metal, an alkaline metal, an alkaline earth metal, a lanthanide, an actinide, and combinations thereof. Metals such as copper, molybdenum, mercury, iridium, palladium, antimony, rhenium, bismuth, platinum, silver, arsenic, rhodium, tellurium, selenium, osmium, gold, lead, germanium, tin, indium, thallium, cadmium, gadolinium, chromium nickel, iron, tungsten, cobalt, zinc, vanadium, or combinations thereof, can also be useful. Examples of alloys include, but are not limited to, 5% lead with reminder antimony, 5% platinum with reminder antimony, 5% copper with reminder indium, 20% lead, 10% silver, 40% indium, 5% copper.

Although liquid anodes are more commonly used in the invention, solid anodes can be used as well, including metals such as main group metals, transition metals, lanthanides, actinides, and/or ceramics (optionally doped with any metal listed herein). Other suitable solid anodes are disclosed in references incorporated herein.

The cathode of the device typically (but not always) is a solid-state cathode, e.g. a metal oxide or a mixed metal oxide. Specific examples include tin-doped $In_2O_3$, aluminum-doped zinc oxide and zirconium-doped zinc oxide. Another example of a solid state cathode is a perovskite-type oxide having a general structure of $ABO_3$, where "A" and "B" represent two cation sites in a cubic crystal lattice. A specific example of a perovskite-type oxide has a structure $La_xMn_yA_aB_bC_cO_d$ where A is an alkaline earth metal, B is selected from the group consisting of scandium, yttrium and a lanthanide metal, C is selected from the group consisting of titanium, vanadium, chromium, iron, cobalt, nickel, copper, zinc, zirconium, hafnium, aluminum and antimony, x is from 0 to about 1.05, y is from 0 to about 1, a is from 0 to about 0.5, b is from 0 to about 0.5, c is from 0 to about 0.5 and d is between about 1 and about 5, and at least one of x, y, a, b and c is greater than zero. More specific examples of perovskite-type oxides include $LaMnO_3$, $La_{0.84}Sr_{0.16}MnO_3$, $La_{0.84}Ca_{0.16}MnO_3$, $La_{0.84}Ba_{0.16}MnO_3$, $La_{0.65}Sr_{0.35}Mn_{0.8}Co_{0.2}O_3$, $La_{0.79}Sr_{0.16}Mn_{0.85}CO_{0.15}O_3$, $La_{0.84}Sr_{0.16}Mn_{0.8}Ni_{0.2}O_3$, $La_{0.84}Sr_{0.16}Mn_{0.8}Fe_{0.2}O_3$, $La_{0.84}Sr_{0.6}Mn_{0.8}Ce_{0.2}O_3$, $La_{0.84}Sr_{0.16}Mn_{0.8}Mg_{0.2}O_3$, $La_{0.84}Sr_{0.16}Mn_{0.8}Cr_{0.2}O_3$, $La_{0.6}Sr_{0.35}Mn_{0.8}Al_{0.2}O_3$, $La_{0.84}Sc_{0.16}MnO_3$, $La_{0.84}Y_{0.16}MnO_3$, $La_{0.7}Sr_{0.3}CoO_3$, $LaCoO_3$, $La_{0.7}Sr_{0.3}FeO_3$, $La_{0.5}Sr_{0.5}CO_{0.8}Fe_{0.2}O_3$, or other LSM materials. As used herein, "LSM" refers to any lanthanum-strontium-manganese oxide, such as $La_{0.84}Sr_{0.16}MnO_3$. In other embodiments, the ceramic may also include other elements, such as titanium, tin, indium, aluminum, zirconium, iron, cobalt, manganese, strontium, calcium, magnesium, barium, or beryllium. Other examples of solid state cathodes include $LaCoO_3$, $LaFeO_3$, $LaCrO_3$, and a $LaMnO_3$-based perovskite oxide cathode, such as $La_{0.75}Sr_{0.25}CrO_3$, $(La_{0.6}Sr_{0.4})_{0.9}CrO_3$, $La_{0.6}Sr_{0.4}FeO_3$, $La_{0.6}Sr_{0.4}CoO_3$ or $Ln_{0.6}Sr_{0.4}CoO_3$, where Ln may be any one of La, Pr, Nd, Sm, or Gd. Alternatively, the cathode may comprise a metal, for example, the cathode may comprise a noble metal. Examples of metals useful in cathodes include any one or more than one of platinum, palladium, gold, silver, copper, rhodium, rhenium, iridium, osmium, and combinations thereof.

Current collectors can be selected to adequately deliver or remove electrical current to or from an electrode and/or, like other components, to operate effectively at typical device temperatures, and/or to be adequately resistant to conditions within the device that can cause chemical degradation to non-resistant materials. Examples include platinum as a cathode current collector, and graphite rod as an anode current collector. A wide variety of useful current collectors are described in International Patent Application No. PCT/US03/03642 and U.S. Patent Application No. 60/391,626, referenced above. In one arrangement, a current collector includes a sheathing material, a liquid metal (metal or alloy that is a liquid under typical operating conditions within an interior space of the sheathing material, and an electrical lead in contact with the liquid metal. Liquid metals can be selected from among, for example, copper, molybdenum, iridium, palladium, antimony, rhenium, bismuth, platinum, silver, arsenic, rhodium, tellurium, selenium, osmium, gold, lead, germanium, tin, indium, thallium, cadmium, chromium, nickel, iron, tungsten, cobalt, zinc, vanadium, gallium, aluminum, and alloys thereof. Examples of sheathing material include scandium, indium, a lanthanide, yttrium, titanium, tin, indium, aluminum, zirconium, iron, cobalt, manganese, strontium, calcium, magnesium, barium, beryllium, a lanthanide, chromium, and mixtures thereof. Combinations of any of the above compounds are also possible, such as alloys of any of the above metals, which may include combinations of the above metals or combinations with other metals as well. One example is a platinum-silver alloy having any suitable ratio, for example, 5% Pt:95% Ag, 10% Pt:90% Ag, 20% Pt:80% Ag, or the like. In some embodiments, the electrically conducting material and/or the sheathing material may be a heterogeneous material formed from a mix of materials. The mixture may be a mixture including any one of the materials previously described, for example, a ceramic mixture, a metal mixture, or a cermet mixture, where a "cermet" is a mixture of at least one metal compound and at least one ceramic compound, for example, as previously described. As one example, the cermet may include a material such as copper, silver, platinum, gold, nickel, iron, cobalt, tin, indium and a ceramic such as zirconium oxide, an aluminum oxide, an iron oxide, a nickel oxide, a lanthanum oxide, a calcium oxide, a chromium oxide, a silicate, a glass. Combinations of these materials are also contemplated. Additionally, other materials may be incorporated in the cermet, for example, graphite. Suitable cermet mixtures may include, for example, Cu/YSZ, NiO/NiFe$_2$O$_4$, NiO/Fe$_2$O$_3$/Cu, Ni/YSZ, Fe/YSZ, Ni/LCC, Cu/YSZ, NiAl$_2$O$_3$, or Cu/Al$_2$O$_3$. As used herein, "LCC" refers to any lanthanum-calcium-chromium oxide.

The electrolyte of the device should be selected to allow conduction of ions between the cathode and anode, typically the migration of oxygen ions. Solid state electrolytes can be used, and examples include metal oxides and mixed metal oxides.

An example of a solid state electrolyte is an electrolyte having a formula $(ZrO_2)(HfO_2)_a(TiO_2)_b(Al_2O_3)_c(Y_2O_3)_d(M_xO_y)_e$ where a is from 0 to about 0.2, b is from 0 to about 0.5 c is from 0 to about 0.5, d is from 0 to about 0.5, x is greater than 0 and less than or equal to 2, y is greater than 0 and less than or equal to 3, e is from 0 to about 0.5, and M is selected from the group consisting of calcium, magnesium, manganese, iron, cobalt, nickel, copper, and zinc. More specifically, examples of solid state electrolytes include $(ZrO_2)$, $(ZrO_2)(Y_2O_3)_{0.08}$, $(ZrO_2)(HfO_2)_{0.02}(Y_2O_3)_{0.08}$, $(ZrO_2)(HfO_2)_{0.02}(Y_2O_3)_{0.05}$, $(ZrO_2)(HfO_2)_{0.02}(Y_2O_3)_{0.08}(TiO_2)_{0.10}$, $(ZrO_2)(HfO_2)_{0.02}(Y_2O_3)_{0.08}(Al_2O_3)_{0.10}$, $(ZrO_2)(Y_2O_3)_{0.08}(Fe_2O_3)_{0.05}$, $(ZrO_2)(Y_2O_3)_{0.08}(CoO)_{0.05}$, $(ZrO_2)(Y_2O_3)_{0.08}(ZnO)_{0.05}$, $(ZrO_2)(Y_2O_3)_{0.08}(NiO)_{0.05}$, $(ZrO_2)(Y_2O_3)_{0.08}(CuO)_{0.05}$, $(ZrO_2)(Y_2O_3)_{0.08}(MnO)_{0.05}$ and $ZrO_2CaO$. Other examples of solid state electrolytes include a YSZ, $CeO_2$-based perovskite, such as $Ce_{0.9}Gd_{0.1}O_2$ or $Ce_{1-x}Gd_xO_2$ where x is no more than about 0.5; lanthanum-doped ceria, such as $(CeO)_{1-n}(LaO_5)_n$ where n is from about 0.01 to about 0.2; a $LaGaO_3$-based perovskite oxide, such as $La_{1-x}A_xGa_{1-y}B_yO_3$ where A can be Sr or Ca, B can be Mg, Fe, Co and x is from about 0.1 to about 0.5 and y is from about 0.1 to about 0.5 (e.g. $La_{0.9}Sr_{0.1}Ga_{0.8}Mg_{0.2}O_3$); a $PrGaO_3$-based perovskite oxide electrolyte, such as $Pr_{0.93}Sr_{0.07}Ga_{0.85}Mg_{0.15}O_3$ or $Pr_{0.93}Ca_{0.07}Ga_{0.85}Mg_{0.15}O_3$; and a $Ba_2In_2O_5$-based perovskite oxide electrolyte, such as $Ba_2(In_{1-x}Ga_x)_2O_5$ or $(Ba_{1-x}La_x)In_2O_5$, where is x is from about 0.2 to about 0.5.

A wide variety of fuels can be used. Generally, the fuel will be gasified at least one step of the process. Examples of classes of fuels include a carbonaceous material; sulfur; a sulfur-containing organic compound such as thiophene, thiourea and thiophenol; a nitrogen-containing organic compound such as nylon and a protein; ammonia, hydrogen and mixtures thereof. Typically, the fuel selected for the device is application-dependent. Examples of a fuel comprising a carbonaceous material include conductive carbon, graphite, quasi-graphite, coal, coke, charcoal, fullerene, buckminsterfullerene, carbon black, activated carbon, decolorizing carbon, a hydrocarbon, an oxygen-containing hydrocarbon, carbon monoxide, fats, oils, a wood product, a biomass and combinations thereof. Examples of a hydrocarbon fuel include saturated and unsaturated hydrocarbons, aliphatics, alicyclics, aromatics, and mixtures thereof. Other examples of hydrocarbons include gasoline, diesel, kerosene, methane, propane, butane, natural gas and mixtures thereof. Examples of oxygen-containing hydrocarbon fuels include alcohols which further include $C_1$-$C_{20}$ alcohols and combinations thereof. Specific examples include methanol, ethanol, propanol, butanol and mixtures thereof. However, almost all oxygen-containing hydrocarbon fuels capable of being oxidized by the anode materials disclosed herein may be used so long as the fuel is not explosive or does not present any danger at operating temperatures. Gaseous fuels such as hydrogen and SynGas (a mixture of hydrogen and carbon monoxide) may also be used in certain embodiments of the invention. In another aspect of the invention, the electrochemical device is capable of operating with more than one type of fuel. The vast majority of prior art fuel cells are designed to operate with a specific fuel type, usually hydrogen and less often methanol. This aspect of the invention makes it possible to capitalize on the benefits of different fuel types. For example, one type of fuel may provide a higher power output whereas another may provide a lower power output but affords lightweight properties. Enhanced performance may be achieved with one type of fuel, yet another type of fuel recharges the anode more efficiently. Other benefits for using different fuel types may be realized, for example, in situations where the price of one fuel type rises and economics dictate the use of a cheaper fuel. Environmental concerns may also be a deciding factor in changing the fuel type. Short term benefits may be realized, for example, in the situation where the supply of one fuel type is exhausted and only another fuel type is readily available.

The oxidant can be selected from species that will serve as oxidizing agent during operation, such as air, pure oxygen or an oxygen-containing gas, at atmospheric pressures or greater.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fuel cell, comprising:
    an anode compartment constructed and arranged to contain an anode that is a liquid metal during operation of the fuel cell;
    a fuel compartment attachable to a source of fuel for the fuel cell; and
    a porous ceramic oxide layer, constructed and arranged to prevent fluid flow between the anode compartment and the fuel compartment, across which anodic oxidation of a fuel provided by the fuel compartment can occur during fuel cell operation.

2. A fuel cell as in claim 1, wherein the porous ceramic oxide layer includes at least a portion physically separating a fuel in the fuel compartment from the anode in the anode compartment during fuel cell operation, across which portion fuel oxidation can occur.

3. A fuel cell as in claim 2, wherein the porous ceramic oxide layer physically completely separates the fuel from the anode during fuel cell operation.

4. A fuel cell as in claim 1, wherein the porous ceramic oxide layer includes at least one pore of dimension allowing physical contact between a fuel in the fuel compartment and the anode in the anode compartment under operating conditions of the fuel cell.

5. A fuel cell as in claim 4, wherein the porous ceramic oxide layer includes a section separating the fuel and the anode, essentially the entire section comprising a porous article including pores of dimension allowing physical contact between the fuel and the anode under operating conditions of the fuel cell.

6. A fuel cell as in claim 4, wherein the porous ceramic oxide layer includes at least a portion physically separating the fuel from the anode during fuel cell operation, across which portion fuel oxidation can occur.

7. A fuel cell as in claim 1, wherein the porous ceramic oxide layer defines a portion of the anode compartment.

8. A fuel cell as in claim 7, constructed and arranged such that the porous ceramic oxide layer, at least one portion thereof, is the sole fuel cell component separating the anode in the anode compartment from a fuel provided in the fuel compartment by the fuel manifold.

9. A fuel cell as in claim 1, wherein the porous ceramic oxide layer defines a portion of the fuel manifold.

10. A fuel cell as in claim 9, constructed and arranged such that the porous ceramic oxide layer, at least one portion thereof, is the sole fuel cell component separating the anode in the anode compartment from a fuel provided in the fuel compartment by the fuel manifold.

11. A fuel cell as in claim 1 wherein a substantial portion of the anode is a liquid metal during operation of the fuel cell.

12. A fuel cell as in claim 1, wherein the porous ceramic oxide layer comprises a mixed ion/electron conductor.

13. A fuel cell as in claim 1, wherein the porous ceramic oxide layer includes at least one ionically-conductive portion.

14. A fuel cell as in claim 1, further comprising a fuel, a substantial portion of which is a gas under operating conditions of the fuel cell.

15. A fuel cell as in claim 1, wherein the porous ceramic oxide layer is substantially cylindrical.

16. A fuel cell as in claim 1, wherein the fuel manifold includes or is connected to an exhaust conduit and the cell further comprises a fuel delivery conduit having an exit for delivery of fuel at an end of the fuel manifold substantially opposite the exhaust end.

17. A fuel cell, comprising:
an anode that is a liquid metal during operation of the fuel cell;
a fuel manifold attachable to a source of fuel for the cell; and
a porous ceramic oxide layer across which, at a location where the anode is physically separated from a fuel provided by the manifold, oxidation of the fuel via the anode can occur during fuel cell operation.

18. A fuel cell as in claim 17, wherein a substantial portion of the fuel is a gas and a substantial portion of the anode is a liquid metal under operating conditions of the fuel cell.

19. A fuel cell as in claim 18, wherein a substantial portion of the anode is a liquid metal under operating conditions of the fuel cell.

20. A fuel cell as in claim 17, wherein a substantial portion of the fuel is a gas under operating conditions of the fuel cell.

21. A fuel cell as in claim 17, wherein a substantial portion of the fuel is a gas under operating conditions of the fuel cell.

22. A fuel cell as in claim 17, wherein the porous ceramic oxide layer comprises a mixed ion/electron conductor.

23. A fuel cell, comprising:
an anode that is a liquid metal during operation of the fuel cell;
a fuel manifold attachable to a source of fuel for the cell; and
a porous ceramic oxide layer across which, at a location where the anode is physically separated from a fuel provided by the manifold, oxidation of the fuel by the anode can occur during fuel cell operation.

24. A fuel cell as in claim 1, wherein the anode comprises tin.

25. A fuel cell as in claim 1, wherein the anode consists essentially of tin.

26. A fuel cell as in claim 17, wherein the anode comprises of tin.

27. A fuel cell as in claim 17, wherein the anode consists essentially of tin.

28. A fuel cell as in claim 23, wherein the anode comprises of tin.

29. A fuel cell as in claim 23, wherein the anode consists essentially of tin.

* * * * *

UNITED STATES PATENT AND TRADEMARK OFFICE
CERTIFICATE OF CORRECTION

PATENT NO. : 7,745,064 B2
APPLICATION NO. : 11/294676
DATED : June 29, 2010
INVENTOR(S) : Adam P. Blake et al.

It is certified that error appears in the above-identified patent and that said Letters Patent is hereby corrected as shown below:

At column 21, line 15 (claim 8), please change "at least one portion" to --at at least one portion--.

Signed and Sealed this

Thirty-first Day of August, 2010

David J. Kappos
*Director of the United States Patent and Trademark Office*